June 28, 1927.  F. A. PURCELL  1,633,677
AUTOMOBILE SIGNAL DEVICE
Filed March 20, 1925
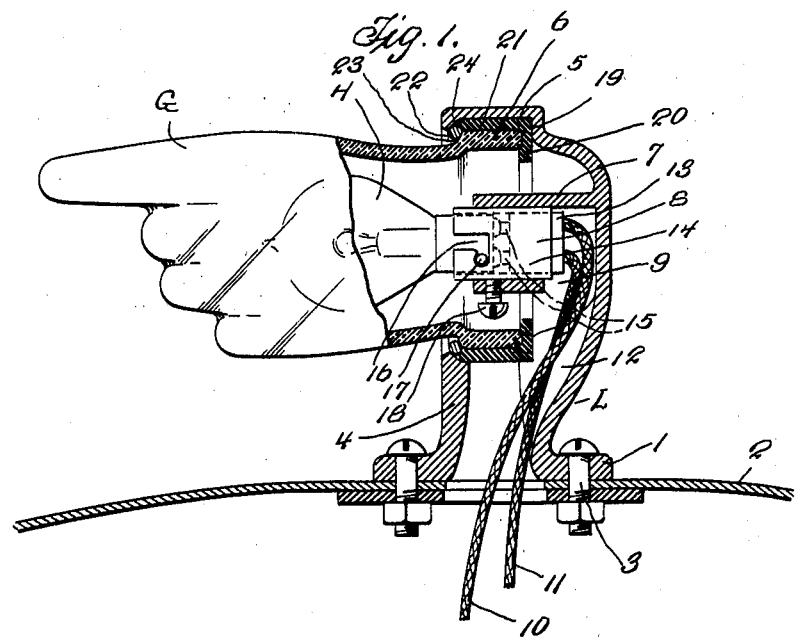
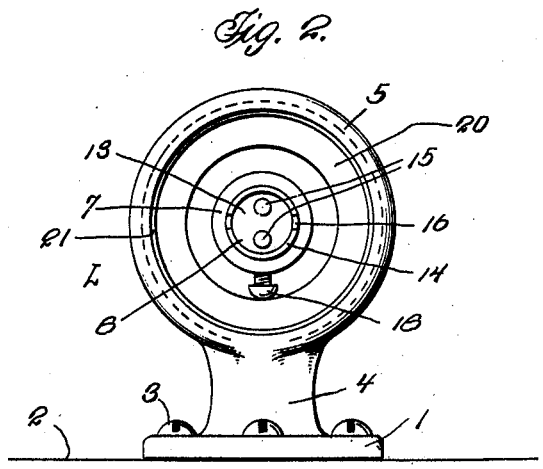
INVENTOR
Francis A. Purcell
BY
ATTORNEY Patented June 28, 1927.

1,633,677

UNITED STATES PATENT OFFICE.

FRANCIS A. PURCELL, OF BROOKLYN, NEW YORK.

AUTOMOBILE SIGNAL DEVICE.

Application filed March 20, 1925. Serial No. 17,099.

This invention relates to an automobile signal device of the type for indicating the intention on the part of a driver to stop or to turn to one side or the other from his course.

The present invention is in the nature of an improvement over what is shown and described in my pending application Serial #722,430 and an object of the present improvement is to simplify, and to make a, more durable and practical signal device than that disclosed in said pending application.

A further object is to so construct the device that it will comprise only a single direction indicating element and so that it may be made to perform its indicating function with equal efficiency whether attached to either the right hand or the left hand side of the vehicle, in fact so that two devices of identical construction may be attached one to each side of the vehicle if desired, being controlled of course preferably by independent circuits so that they may be illuminated selectively at the will of the operator to indicate his intention to turn either to the right or to the left as the case may be.

A further object is to provide a signal device comprising a glass indicating element and a metallic carrier therefore by which to attach it to the fender or other appropriate part of an automobile, and to provide simple and efficient means for safely detachably connecting the glass indicating element of the metallic carrier.

A further object is to provide simple and efficient means as a part of the carrier to support an electric bulb by which to illuminate the glass indicating element.

Other objects and aims of the invention, more or less specific than those referred to above, will be in part obvious and in part pointed out in the course of the following description of the elements, combinations, arrangements of parts and applications of principles, constituting the invention, and the scope of protection contemplated will be indicated in the appended claims.

In the accompanying drawings which are to be taken as a part of this specification, and in which I have shown merely a preferred form of embodiment of the invention:—

Fig. 1 is a front elevational view of a signal device constructed in accordance with this invention, a part being shown in vertical central section for disclosing details of construction, and Fig. 2 is a side elevational view of the carrier part seen in Fig. 1, the glass indicator element being removed.

Referring to the drawings for describing in detail the structure therein shown the reference character L indicates the carrier part. This part is provided with a bottom flange 1 adapted to be connected with the fender or other part as 2 of the vehicle, as by means of bolts or the like 3. A pedestal 4 rises from the flange 1 and this is enlarged at its upper end to provide an annular casing or seat 5 adapted to receive the attaching collar portion 6 of the indicating element G.

Centrally of the seat 5, and projecting forwardly from the rear wall of said seat, is a hollow sleeve 7 within which is arranged a socket member 6 for receiving a lamp or bulb H. The sleeve 7 has an opening 9 therethrough through which lead wires as 10 and 11 may extend into communication with the socket element 8. The pedestal portion 4 is made hollow as at 12 to facilitate the convenient passage of the wires 10 and 11.

The socket member 8 may be of any approved construction but as shown it is preferably an ordinary commercial element consisting of a small body of insulating material as 13 about which is arranged a metallic sleeve 14, the insulating material 13 carrying the usual contact terminals 15 and the metallic sleeve having a bayonet slot 16 to receive the retaining pin 17 of the lamp H.

This socket member may be held in position within the sleeve 7 by any appropriate means but for the purpose of illustration the drawing herewith shows the use of an ordinary set screw 18 carried by the sleeve and arranged to exert pressure against the socket member to hold the socket member in any position to which it is adjusted within the sleeve, it being noted in this connection that the socket member may be freely adjusted longitudinally of the sleeve when the set screw is loose.

The seat part 5 for receiving the indicating element is formed with a ledge 19 therein upon which rests the annular gasket 20, preferably of rubber, in position to receive the annular end edge of the collar 6.

Within the seat is also arranged an annular gasket 21, also preferably of rubber, disposed to fit against the annular wall of the seat and to stand in position interposed between said wall and the outer annular surface of the collar 6, the thickness of said gasket 21 being such as to require a certain amount of radial compression of the gasket in order to permit entry of the collar 6.

The two gaskets 20 and 21 thus efficiently cushion the walls of the seat 5 and prevent likelihood of injury to the glass indicating element and particularly to the collar portion 6.

Any suitable means may be employed to retain the indicating element in position within the seat and for this purpose the drawing illustrates the use of a spring ring 22 arranged in position between an outwardly facing shoulder portion 23 of the indicating element and a relatively inwardly facing shoulder portion 24 provided at the annular edge of the seat. The shoulder 24 is shaped to diverge inwardly so that the tendency of the spring ring 22 to expand radially will cause it, and consequently the shoulder 23, to move, or to tend to move, inwardly and in this way hold the indicating element firmly in position within the seat and against the gasket 20.

The screw 18 is preferably arranged so that it faces downwardly from the sleeve 7 directly in line with the hollow of the pedestal or standard 4 since by this arrangement easy and convenient access is given to the screw as by means of a screw-driver projected upwardly through the hollow of the standard, it being understood of course that the indicating element and the gasket 21 will at such times be removed.

The indicating element G may be of any desired shape and size. As indicated it consists of a hollow glass hand into which the lamp H projects, the glass being of course transparent, or translucent, so that the light of the lamp may shine properly therethrough. The collar portion 6 is formed at the wrist part of this hand so that when attached to the carrier the entire hand extends laterally away from one side of the carrier.

Both the front and rear surfaces of the glass hand are preferably identical in appearance in order to facilitate the use of a given hand either at the right or left hand side of the vehicle. The drawing Figure 1 may therefore be considered to show the front surface of the hand appearing in said figure, and the opposite side would be identically the same. The opposite sides of the carrier are also preferably identical for the same purpose.

Signal devices constructed as herein shown and described may be conveniently placed upon the upper surface of the vehicle fenders, either front or rear and at either or both sides. A signal device placed at the left hand side would most properly be arranged with its indicating hand pointing toward the left while one at the right hand side would most properly have its indicating hand pointing toward the right. This however is a matter of choice with the driver or vehicle owner as he may obviously place them in any relation he desires, it being noted that by the construction shown and described any given signal device may be placed by the vehicle owner to point in any direction he wishes.

Any suitable form of circuit and switch mechanism not illustrated may be employed for selectively illuminating the signal device at different points.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A signal device of the type described comprising a hollow standard having front and rear walls and having means at its lower end by which to fix the standard to a suitable support, the front wall of the standard having an opening therethrough facing laterally of the standard adjacent the upper end of the standard, a hollow sleeve projecting laterally from the rear wall of the standard centrally of said opening, a socket element within said sleeve, means carried by said sleeve by which to retain the socket element within said sleeve, said sleeve having an opening formed through the side wall thereof adjacent the rear wall of the standard communicating with the interior of the standard through which conductor wires extending through the hollow of the standard may reach the socket element, a lamp carried by the socket element projecting exteriorly of the standard through the opening, a hollow glass indicating element telescoping over said lamp and projecting into said opening to adjacent said rear wall, means to retain the indicating element in position, and the rear wall of the standard being shaped to provide a vertically extending recess internally at the rear of the standard continuous above and below the plane of the bottom edge of said opening constituting a passage-way for conductor wires about the inner end of the indicator element to said socket element.

2. A signal device of the type described comprising a hollow standard having front and rear walls and having means at its lower end by which to fix the standard to a suitable support, the front wall of the standard having an opening therethrough facing laterally of the standard adjacent the upper end of the standard, a hollow sleeve projecting laterally from the rear wall of the standard centrally of said opening, a socket element within said sleeve, means carried by said sleeve by which to retain the socket element within said sleeve, said sleeve having an opening therethrough adjacent the rear wall of the standard communicating with the interior of the standard through which conductor wires extending through the hollow of the standard may reach the socket element, a lamp carried by the socket element projecting exteriorally of the standard through the opening, a hollow glass indicating element telescoping over said lamp and having an attaching portion projecting into said opening, a cushion element surrounding the attaching portion of the indicating element and fitting snugly between said attaching portion and the surrounding wall of the opening, said cushion element having a part interposed between the end edge of the indicating element and a rear wall portion of the standard to resiliently limit the movement of the indicating element into said opening, a separately formed retaining member engaging between the indicating element and a wall portion of said opening to retain the indicating element in close engagement with said cushion element, and the rear wall of the standard being shaped to provide a vertically extending recess internally at the rear of the standard continuous above and below the plane of the bottom edge of said opening constituting a passage-way for conductor wires about said cushion element to said socket element.

3. A signal device of the type described comprising a hollow standard having front and rear walls and opposite side walls and having means at its lower end by which to fix the standard to a suitable support, the front wall of the standard having an annular opening therethrough facing laterally of the standard adjacent the upper end of the standard, the side walls and parts of the front and rear walls being shaped to constitute an annular seat accessible through said opening, a lamp support projecting from the rear wall into said seat, a lamp carried by said lamp support and projecting outwardly therefrom through said opening, an indicating element telescoping over said lamp and projecting into said seat, cushioning means fitting snugly between said indicating element and said seat, and means to retain the indicating element within said seat.

4. A signal device of the type described comprising a hollow standard having front and rear walls and having means at its lower end by which to fix the standard to a suitable support, the front wall of the standard having an opening therethrough facing laterally of the standard adjacent the upper end of the standard, a hollow sleeve projecting laterally from the rear wall of the standard centrally of said opening, a socket element within said sleeve movable longitudinally thereof adapted to carry a lamp projecting outwardly through said opening, a retaining screw carried by the sleeve adapted upon rotation to retain the socket element in any position to which it is adjusted within the sleeve, said retaining screw facing downwardly from the sleeve so as to be accessible through the hollow of the standard, an indicating element extending into said opening adapted to be illuminated by said lamp, and means by which said indicating element is detachable.

In testimony whereof I affix my signature.

FRANCIS A. PURCELL.